(12) United States Patent
Rohleder et al.

(10) Patent No.: US 11,379,380 B2
(45) Date of Patent: Jul. 5, 2022

(54) SYSTEMS AND METHODS FOR MANAGING CACHE REPLACEMENT

(71) Applicant: NXP USA, Inc., Austin, TX (US)

(72) Inventors: Michael Rohleder, Unterschleissheim (DE); Cristian Macario, Munich (DE); Marcus Mueller, Munich (DE)

(73) Assignee: NXP USA, Inc., Austin, TX (US)

( * ) Notice: Subject to any disclaimer, the term of this patent is extended or adjusted under 35 U.S.C. 154(b) by 71 days.

(21) Appl. No.: 16/869,249

(22) Filed: May 7, 2020

(65) Prior Publication Data
US 2021/0349834 A1 Nov. 11, 2021

(51) Int. Cl.
*G06F 12/121* (2016.01)

(52) U.S. Cl.
CPC .... *G06F 12/121* (2013.01); *G06F 2212/1021* (2013.01)

(58) Field of Classification Search
CPC ................ G06F 12/121; G06F 2212/1021
USPC ........................................................ 711/104
See application file for complete search history.

(56) References Cited

U.S. PATENT DOCUMENTS

| | | | |
|---|---|---|---|
| 6,408,362 B1* | 6/2002 | Arimilli | G06F 12/127 711/E12.076 |
| 6,633,891 B1 | 10/2003 | Bamford et al. | |
| 7,069,388 B1 | 6/2006 | Greenfield et al. | |
| 7,669,009 B2 | 2/2010 | Kottapalli et al. | |
| 8,250,332 B2 | 8/2012 | Plondke et al. | |
| 8,601,217 B2 | 12/2013 | Swart et al. | |
| 9,021,206 B2 | 4/2015 | Flemming et al. | |
| 9,122,617 B2 | 9/2015 | Duvalsaint et al. | |
| 9,280,478 B2 | 3/2016 | Sampathkumar | |
| 9,372,811 B2 | 6/2016 | Ramrakhyani et al. | |
| 9,418,019 B2 | 8/2016 | Lepak et al. | |
| 10,120,712 B2 | 11/2018 | Singer et al. | |
| 10,120,713 B2 | 11/2018 | Rohleder et al. | |
| 2008/0091880 A1* | 4/2008 | Vishin | G06F 12/0842 711/122 |
| 2008/0235456 A1 | 9/2008 | Kornegay et al. | |
| 2010/0153650 A1* | 6/2010 | Guthrie | G06F 12/126 711/133 |
| 2010/0262784 A1* | 10/2010 | Guthrie | G06F 12/126 711/122 |

(Continued)

FOREIGN PATENT DOCUMENTS

KR 10-1976320 B1 5/2019

*Primary Examiner* — William E. Baughman

(57) ABSTRACT

A method of managing load units of executable instructions between internal memory in a microcontroller with multiple bus masters, and a non-volatile memory device external to the microcontroller. A copy of the load units are loaded from the external memory device into the internal memory for use by corresponding bus masters. Each load unit is with a corresponding load entity queue and each load entity queue is associated with a corresponding one of the multiple bus masters. Each load entity queue selects an eviction candidate from the associated copy of the load units currently loaded in the internal memory. Information identifying the eviction candidate for each load entity queue is broadcasted to all load entity queues. The eviction candidate is added to a set of managed eviction candidates if none of the load entity queues vetoes using the eviction candidate.

24 Claims, 5 Drawing Sheets

(56) References Cited

U.S. PATENT DOCUMENTS

| | | | |
|---|---|---|---|
| 2012/0124294 A1* | 5/2012 | Atkisson | H04L 12/403 |
| | | | 711/135 |
| 2013/0191601 A1* | 7/2013 | Peterson | G06F 12/0868 |
| | | | 711/137 |
| 2014/0164711 A1 | 6/2014 | Loh et al. | |
| 2015/0169459 A1* | 6/2015 | Huang | G06F 12/0864 |
| | | | 711/128 |
| 2016/0055100 A1* | 2/2016 | Loh | G06F 12/128 |
| | | | 711/122 |
| 2018/0173636 A1 | 6/2018 | Reed et al. | |
| 2018/0203798 A1* | 7/2018 | Hughes | G06F 12/122 |
| 2019/0004970 A1* | 1/2019 | Pham | G06F 3/0673 |
| 2019/0369903 A1* | 12/2019 | Tsirkin | G06F 3/0673 |

* cited by examiner

SYSTEMS AND METHODS FOR MANAGING CACHE REPLACEMENT

FIELD

The field of the invention relates to a memory system and a method for memory management therein that is supporting software execution in an embedded information system, such as in-vehicle (in an automotive environment).

RELATED ART

Computer systems often benefit from a hierarchical memory design, for example in which (at least partial) copies of the memory content can be stored (i.e., cached) at different levels within the memory hierarchy. Often, the hardware supporting the different memory levels has different capacities, costs, and access times. Generally speaking, faster and smaller memory circuits are often located closer to processor cores or other processing elements within the system, and serve as caches. Other types of memory storage devices in the processing system may be larger and less expensive but may also be relatively slow compared to those memories acting as caches.

Currently, embedded processing systems used in a vehicle support an application image having, for example, up to 16 megabytes in size, calling for an instruction cache in the range of 4 to 12 Megabytes. In the forthcoming years, the amount of data and instructions being handled is likely to increase, with applications requiring different amounts of information.

BRIEF DESCRIPTION OF THE DRAWINGS

The present technology may be better understood, and its numerous objects, features, and advantages made apparent to those skilled in the art by referencing the accompanying figures.

The use of the same reference symbols in different drawings indicates similar or identical items unless otherwise noted. The figures are not necessarily drawn to scale.

DETAILED DESCRIPTION

Figure 1:
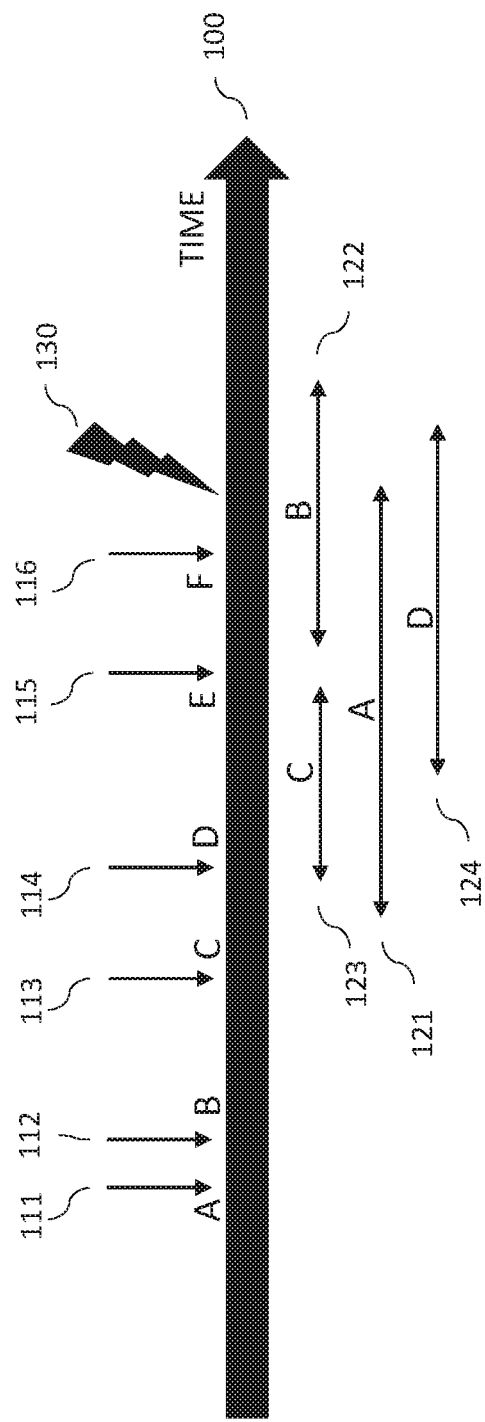
FIG. 1 illustrates a timeline of cache eviction candidate selection in accordance with selected embodiments of the invention.

Embodiments of systems and methods for managing cache replacement processing of variable sized load units holding executable instructions and constant data are disclosed that manage loading of the instructions and data into a buffer memory such as (random access memory (RAM)) internal to a microcontroller from a memory device external to the microcontroller. The external memory device provides larger storage for applications currently running than can be buffered within memory internal to the microcontroller. Unnecessary impact on the application code and load bandwidth is avoided by the capability to process variable sized load units. The cache operation supports execution of multiple applications in the microcontroller by multiple processor cores that may be using more than one instance of the same or different operating systems, along with other types of bus masters that access instructions or the constant data in memory. The systems and methods disclosed herein are implemented in a cache control subsystem that is further referred to as Operating System Aware Task Caching (OTC).

Unlike known processor cache arrangements that are limited to processing one size of load units for cache memory, variable size load units are supported by the cache management components disclosed herein via decoupled load request and cache eviction operations. By decoupling the request and eviction operations, one complexity of variable size load units is overcome by evicting multiple load units to provide space for a larger load unit, or the inverse case in which multiple smaller units can be loaded into the free space resulting from the eviction of a larger load unit. More than one candidate for eviction is selected in case a larger load unit is requested thereby forcing multiple load units to be evicted to provide sufficient space. The multiple candidates are appropriately managed until they are actually used, as a good eviction candidate at time X may be an unsuitable candidate at time X+Y. The complexity of managing multiple eviction candidates is significantly higher when the cache content is shared between multiple bus masters (for example, processor cores) that may be executing different instructions located in different load units located within the cache.

Decoupling the eviction and request operations can also permit further optimizations of the cache behavior. For example, to optimize the contents of the large buffer memory, the most worthy data elements to be kept in the memory may be identified. Such an optimization requires one or more suitable eviction candidates to be identified in advance, which is not possible when a replacement candidate is identified on demand, as with traditional instruction caches.

As noted above, external memory can store more than one image, e.g., to support over-the-air (OTA) update of the images, where one image is holding the instructions and constant data of the applications that are concurrently executed within a microcontroller. Even providing sufficient internal memory for storing all instructions and constant data of a single image concurrently in the internal RAM of typical MCUs in addition to the RAM required for the application data may result in a RAM size that is prohibitively expensive. Before instructions of these applications can be executed within an MCU that does not employ non-volatile memory, the instructions are copied from external non-volatile memory and loaded into internal memory. An intelligent cache controller that only loads the subset of instructions and constant data that is currently in use/required by an application helps reduce the corresponding size of internal memory needed for this purpose. Such a partial buffering requires in-advance loading of the instructions to ensure their availability in time, which is distinct from traditional caches that perform on-demand loading.

While external non-volatile memory can be substantially larger than internal memory, it is usually significantly slower to access, especially the non-volatile memories suitable for an embedded system within an in-vehicle automotive environment. The situation may be compounded in a multi-core system where multiple processor cores want to access the instruction memory at the same time. This issue is viewed in light of an internal memory which may already having a limiting performance as is obvious by the need of Level 1/Level 2 processor caches in todays embedded systems. Any slower access can present challenges to the timing requirements of an operating system that has to execute tasks in real time, especially the usual embedded systems in the automotive world that have to adhere to very stringent real-time conditions. For example, when implementing breaking, airbag or powertrain applications, an appropriate reaction to an event may be required within a few milli or micro seconds. While related problems can be overcome by preloading internal memory with instructions from the external memory before the running task actually uses them, this may still be too late when there is insufficient bandwidth for loading. When the cache already contains the needed instruction (because it has been loaded earlier and not evicted since then), such preloading can be avoided. This makes the cache replacement strategy and the appropriate management of the cache eviction candidates a prime task for the cache controller element.

As previously mentioned, to accommodate variable sized load units, a single new load unit may require replacing one or more load units already stored in the internal memory. A single replaced load unit may provide space for one or multiple new load units. Thus, a single caching or load request may trigger none (when there is sufficient space free), a single (when a replaced load unit provides sufficient space for a new load unit), or multiple cache replacement operations (otherwise). These replacement operations are further named "evictions" because there is not a real replacement of an earlier load unit by another load unit, but an eviction of a load unit to gain space for a later storage of instructions from another load unit being loaded. Since there may be multiple such load units that need to be evicted after a single load request, an appropriate management of the potential candidates for this eviction is a prime concern. Otherwise the time and effort of finding a new candidate for an eviction may cause another unwanted delay for any load operation that requiring free space.

FIG. 1 illustrates some aspects of the problem of identifying an eviction candidate and the time of identifying an eviction need. The events 111, 112, 113, 114, 115, and 116 depict the time of identifying a load unit A 111, B 112, C 113, D 114, E 115, and F 116 as an eviction candidate. Event 130 depicts the time of identifying that an eviction is required to store a new load unit. The arrows below the time axis 100 depict the time spans that respective load units are needed, where arrow 121 depicts the time span for load unit A, arrow 122 the time span for load unit B, arrow 123 the time span for load unit C, and arrow 124 the time span for load unit D. Here the term "needed" refers to the knowledge that the cache of the corresponding load unit is currently in use or may be in use in a foreseeable future. Load units A, B, and D are needed at the time of event 130 and are therefore not available for eviction. Inhibiting the usage of an earlier selected eviction candidate upon identifying an eviction need can be based on the need for the candidate at the time of event 130.

Another tradeoff depicted in FIG. 1 is related to the management of the load unit C as an eviction candidate. Load unit C is needed during a time span of its identification as an eviction candidate 113 but is no longer needed at the time of event 130. Eviction candidates that are determined to be needed during their storage can be discarded to reduce the number of candidates available when event 130 occurs.

The internal memory used for OTC caching is usually shared across multiple requestors for instructions and constant data, which are usually implemented as processor cores or other bus master types (for example, an DMA engine, a coprocessor, or a specific processing element that has bus master capabilities) within an embedded system that have been earlier referred to as cache users. The load requests for supporting these cache users are preferably processed by a set of load entity queues, where one load entity queue supports an associated cache user and the load requests required by this activity. Each load entity queue may have specific preferences for the selection of a load unit for the cache replacement operation to reflect the specific requirements of the differing application and eventually differing operating system managing the application.

It is desirable to share the load units managed by these load entity queues when corresponding code is shared across applications (for example, in case of a shared library or a set of common constants) or between the tasks of an operating system that is executed on multiple processor cores (for example, a common function shared by multiple tasks of an operation system) implemented within a MCU. Such sharing of code may result in conflicting operating conditions for a shared cache used by these cache users; for example, a load entity queue may identify the need for a load unit (to be loaded or kept in the buffer memory) that is selected for eviction by another load entity queue. In this context, a load entity queue may refer to a load unit as "needed" when a) it is the load unit containing the instructions currently executed, b) it is a load unit within the set of L load unit instances containing instructions known or assumed to be executed soon (which may be already in the cache or requested or scheduled for loading), c) it is a load unit containing instructions that is likely within the call stack of the current function (within the set of N recently used load units), or e) within another set of M load unit instances marked locked for later usage by software (where L, M, N are reasonably small numbers, e.g., 1-32, reflecting the limited set of load unit elements that can be recorded within the hardware elements of a load entity queue).

Figure 2:
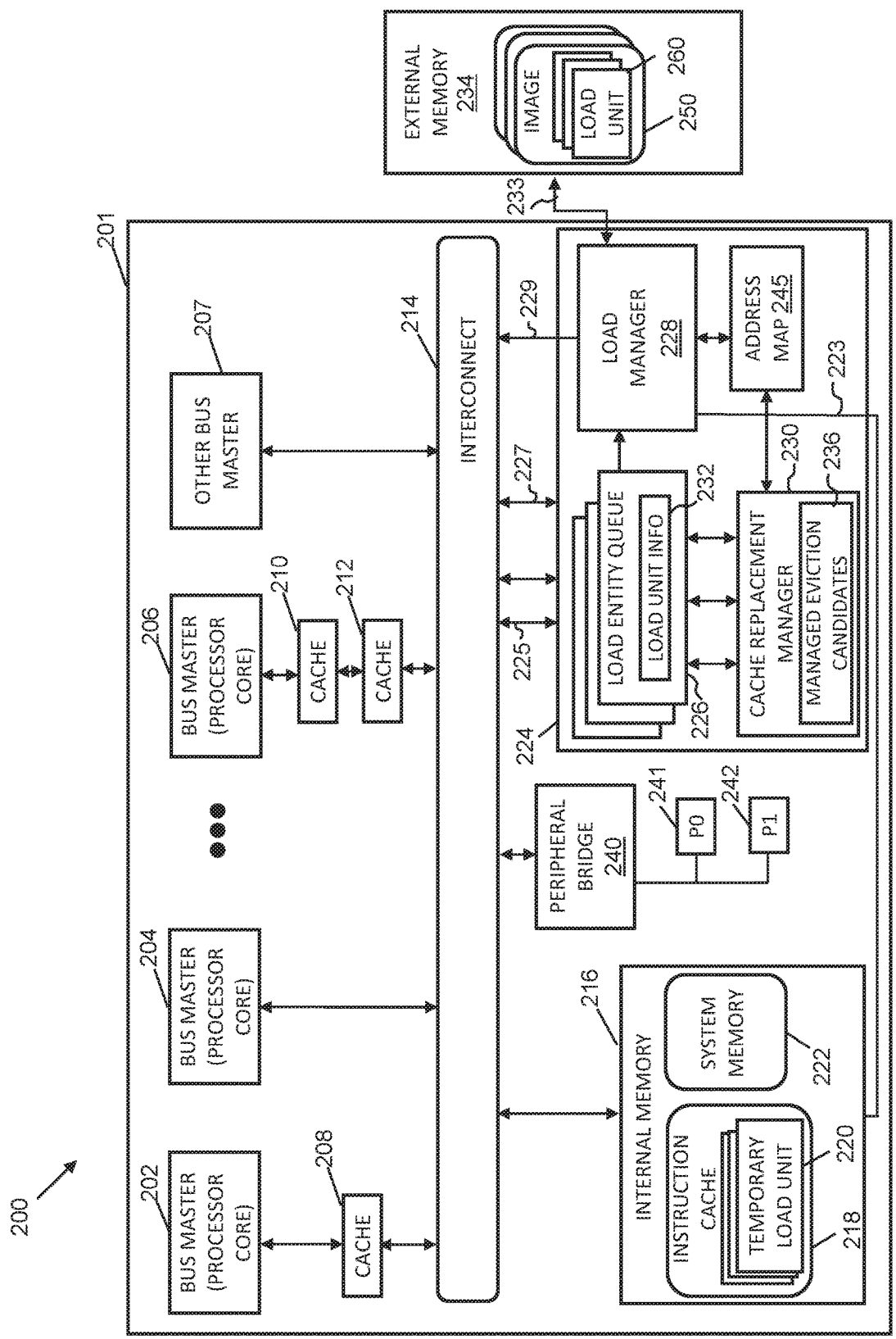
FIG. 2 illustrates a block diagram of a processing system in accordance with selected embodiments of the invention.

FIG. 2 illustrates a block diagram of processing system 200 in accordance with selected embodiments of the invention that includes an operating system task aware caching (OTC) subsystem for scheduling operations with variably sized load units to be performed within processing system 200. Processing system 200 includes microcontroller 201 with two or more bus masters such as processor cores 202, 204, 206, and other bus masters such as direct memory access bus master 207 and/or other suitable bus masters. Processor cores 202, 204, 206 may employ their own dedicated cache devices. In the embodiment shown, processor core 204 is not coupled to a dedicated cache, processor core 202 is coupled to a single dedicated cache 208, and processor core 206 is coupled to a hierarchy of dedicated cache 210, 212. Dedicated cache 208, 210, 212 can store data and instructions that are used often by respective processor cores 202, 206 and are usually located in the vicinity of processor cores 202, 206. Cache 208, 210, 212 are optional and may be available in addition to embodiments of the OTC caching subsystem disclosed herein.

Dedicated caches 208, 210, 212 are usually located in the vicinity of an associated processor core 202, 206 and attempt to avoid the latency incurred when processor cores 202, 206 communicate with other devices internal to the microcontroller 201, such as the internal memory 216. Dedicated caches 208, 210, 212 perform an on-demand loading and operate independently of OTC controller 224, which uses an anticipation mechanism and the internal memory 216 as storage to avoid the latency and bandwidth issues when accessing the external memory 234.

Bus masters 202, 204, 206, 207 and other interconnect and peripheral devices (not shown) can be operably coupled to interconnect 214, which may be a single interconnect or a set of specific interconnects. Interconnect 214 couples bus masters 202, 204, 206, 207 to communicate with bus slaves responding to access requests. Examples of bus slaves can include internal memory device 216, and peripherals represented by P0 241 and P1 242, which may be connected to interconnect 214 via peripheral bridge 240.

Internal memory device 216 can include multiple memory blocks, which may be organized in random access memory (RAM) banks permitting concurrent accesses to different memory banks by multiple bus masters 202, 204, 206, 207. Internal memory device 216 provides storage for two functions: i) a first section is designated as system memory 222 that is utilized for storing the data for the applications executed within the processing system 200, and ii) a second section is designated as instruction cache 218 to hold instructions and constant data of the applications in structures referred to as load units 220. The sections for instruction cache 218 and system memory 222 may span multiple banks and the content of a bank can be utilized by both sections; there is no relationship between the sections for instruction cache 218 and system memory 222 and the banks.

Load units 220 contain a copy of the instructions and constant data associated with a corresponding load unit 260 of an application within an image 250 in external memory 234. The corresponding information about load units 260 of an image 250 may be specified, for example, in table format, that contains relevant properties for every load unit 260. The relevant properties can be stored separately from the instructions and constant data contained within load units 260 within metadata (not shown). Metadata may alternatively be stored in a different location in external memory 234.

Microcontroller 201 further includes OTC controller 224 that includes one or more load entity queues 226, load manager 228, address map 245, and cache replacement manager 230, as well as other components that are not shown. The components of OTC controller 224 may be implemented as separate units that interact with other components that are also implemented separately to provide the functionality of OTC controller 224. OTC controller 224 is operably coupled to interconnect 214 via one or more register interface(s) 225, 227 as a peripheral and/or bus master to access other bus slaves, for example, internal memory 216. In addition, or alternatively, one or more components of OTC controller 224 may be directly coupled to internal memory 216 via a direct connection 223 to access internal memory 216. OTC controller 224 (or load manager 228 when implemented separately) can be coupled to external memory 234 via interface 233.

Each instance of load entity queues 226 supports access requests from an associated bus master 202, 204, 206, 207. Load entity queues 226 may utilize a set of control and status registers specific to each load entity queue 226 in addition to common registers of OTC controller 224. Both the specific and common sets of registers can be accessed from interconnect 214 via one of register interfaces 225, 227. Each load entity queue 226 is further coupled to cache replacement manager 230 and to load manager 228. The interface to load manager 228 is used by a load entity queue 226 to request the loading of a load unit 260 from external memory 234.

During processing of load units 260, load entity queues 226 may store load unit information 232 to identify relevant information for at least one load unit 260 that is currently managed by a corresponding load entity queue 226. The relevant load unit information 232 can be metadata reflecting information for a subset of load units 260 contained within an image 250. Metadata for load units 260 can be stored along with or within image 250 in external memory 234, and may be temporarily loaded into internal memory 216. Load unit information 232 related to load units 260 being managed by load entity queue 226 may be read from internal memory 216 via bus master interface 227 or via direct connection 223 between internal memory 216 and OTC controller 224. Load unit information 232 may be stored in other locations in OTC controller 224 in other embodiments.

Two or more different types of load entity queues 226 may be implemented. A first type of load entity queue 226 can provide the full functionality required by the most complex type of bus master type, which will be usually be a processor core 202, 204, 206. Other types of loader entity queues 226 may provide only a subset or reduced form of functionality to align with specific needs of a particular bus master or provide a cost-effective implementation for bus masters implementing significantly less functionality. For the sake of simplification such types of load entity queues that do not implement the full functionally are referred to as a "reduced" load entity queue 226.

Load manager 228 is coupled to communicate directly with the load entity queue(s) 226, address map device 245 and cache replacement manager 230. Load manager 228 may also provide a register interface (not shown) to interconnect 214 to interact with software and utilize a bus master interface to access internal memory 216, either through interconnect 229 or direct connection 223 to internal memory 216. Load manager 228 communicates over interface 233 with external memory device 234 to request the content of load units 260 from external memory 234 that are stored as temporary load units 220 in instruction cache portion 218 of internal memory 216.

Another element shown in OTC controller 224 is address map device 245, which is connected to load manager 228 and cache replacement manager 230. Address map device 245 is queried at least once for a free storage location when load manager 228 wants to store a first load unit 260 or a part of such a load unit in instruction cache 218. When there is sufficient free storage available in instruction cache 218, address map device 245 provides corresponding information regarding the space available to load manager 228. When there is not enough free storage available, address map device 245 provides an eviction request to cache replacement manager 230. Upon receiving such an eviction request, cache replacement manager 230 provides information about a temporary load unit 220 that is selected for eviction. The location of the load unit 220 selected for eviction is used by address map device 245 to free the storage space utilized by the load unit 220 selected for eviction. The free storage space can then be utilized for storing the instructions and constant data of the first load unit 260 as a temporary load unit 220 in instruction cache 218. By providing this functionality, address map device 245 manages the usage of free storage space within instruction cache 218 to store a copy of the first load unit 260 as temporary load unit 220 and to release storage space upon eviction of temporary load unit 220.

Cache replacement manager 230 is coupled to address map device 245 and load entity queues 226. Cache replacement manager 230 is queried by address map device 245 when address map device 245 determines there is insufficient storage space available in instruction cache 218 for a new temporary load unit 220. The query may be triggered while a load request is processed by load manager 228 that requires storage of a temporary load unit 220. A corresponding query operation is triggered when an event 230 (FIG. 2) occurs that requires one or more temporary load units 220 to be evicted.

To enable rapid response to an eviction requirement, cache replacement manager 230 can store information about a set of managed eviction candidates 236, which are processed when an eviction requirement is identified. Temporary load unit(s) 220 to be evicted from instruction cache 218 can be identified based on specified criteria, such as priority or other suitable criteria. The eviction process itself can be managed by address map device 245 as previously described herein. The set of managed eviction candidates 236 can be generated from eviction candidates identified by the load entity queues 226. The individual identification process ensures that every load entity queue 226 only provides eviction candidates that belong to the set of temporary load units 220 being managed by a respective load entity queue 226. This enables dedicated management of a subset of temporary load units 220 by only those elements of OTC controller 224 that are responsible for managing the subset. Independent management of load units 260 allows appropriate data separation and freedom of interference between related operations and permits independent processing. It also enables a fair handling of the load unit eviction process. For the purpose of selecting an eviction candidate, any load entity queue 226 may utilize corresponding load unit information 232.

External memory device 234 may be implemented using non-volatile memory or other suitable type(s) of memory device(s). External memory device 234 stores at least one image 250 that includes the instructions and constant data associated with at least one application to be executed by processor core 202, 204, 206 implemented within microcontroller 201. At least one image 250 is structured into one or multiple load units 260 that may be used as a unit when loading instructions and constant data from external memory 234. Structuring image 250 into load units 260 can be accomplished, for example, by storing additional metadata (data about data) associated with load units 260 within external memory 234. The metadata may be stored separately (not shown) or as part of image 250. Load manager 228 accesses external memory 234 via interface 232 for loading a load unit 260 and writing the instructions and constant data included in the load unit 260 into the corresponding temporary load unit 220 within the instruction cache 218. The write operation from external memory 234 to instruction cache 218 may utilize a write path 229 through interconnect 214 or direct connection 223 to internal memory 216.

Microcontroller 201 and external memory device 234 are implemented on two different semiconductor devices, which may be within a single package or in different packages. Correspondingly the interface 233 between these two semiconductor devices may be a connection within a package or between two packages.

The size of the internal memory device 216 may be limited compared to the size of external memory device 234. External memory device 234 can hold multiple images 250 and every image 250 can hold instructions and data for one or multiple applications executed by processor cores 202, 204, 206. Execution of the applications is typically controlled by an operating system, and in many situations, the operating systems are required to adhere to stringent real-time conditions and are therefore referred to as real-time operating systems (RTOS). An application program that is controlled by a RTOS can use tasks to identify its units of execution. While images 250 holding the one or multiple applications executed by the microcontroller 201 may be stored in its entirety in external memory device 234, this image can be divided into contiguous segments of executable code, which are referred to as load units 260. A temporary copy 220 of the content a load unit 260 (holding instructions and constant data) can be loaded into instruction cache 218 for usage by a corresponding processor core 202, 204, 206 or other bus master 207. As such load units 260 are a segment of instructions and constant data that reflects one or more complete software functions within a contiguous address range. Temporary load units 220 loaded into the internal memory 216 is operable to be executed or otherwise processed by a processor core 202,104, 206 or used by another bus master 207 within microcontroller 201.

Load units 260 can be specified by splitting the code and instructions of an application within an image 250 along functional boundaries along a set of contiguous address ranges. The functions may be associated with a task or shared by multiple tasks supported by at least one instance of a real-time operating system. The information about load units 260 can be specified in metadata, and may be produced manually during the software development process or by a tool or tool flow that automates the related generation process. Size restrictions can be defined for load units 260, e.g., a minimum size of 1 Kbyte and a maximum size of 63 Kbyte. Other restrictions (e.g., an address alignment of the start or end address) are not required. A preferred order for loading a set of load units 260 may be defined by a load sequence that is also specified within the metadata. Any load sequence may comprise an arbitrary number of load units 260.

Bus masters 202, 204, 206, 207 and OTC controller 224 can perform their respective operations concurrently and independently of one another. For example, the loading of instructions and constant data from the external memory device 234 can be performed independent of the processing being performed by bus masters s 202, 204, 206, 207. This processing can be an execution of software by processor cores 202, 204, 206, which may itself be several software threads executed on multiple processor cores 202, 204, 206 or other processing performed by any other bus master(s) 207. The potential concurrency of operations is dependent on the corresponding hardware that is performing such an operation. Accessing external memory device 234 may be concurrent to any other operation. A potential collision may arise when accessing the internal memory 216. Here a conflict between an access by one of the bus masters and an access by the OTC controller 224 (for example, when writing the content of a load unit read from the external memory) is possible. However the probability of conflicts can be significantly reduced e.g., by using a multi-ported memory or by utilizing a specific memory architecture, like memory interleaving, that enables multiple concurrent accesses.

Microcontroller 201 is capable of retrieving data and instructions from external memory device 234 to replace temporary load units 220 in instruction cache 218. If one processor core 202, 204, 206 wants to replace a temporary load unit 220, but another processor core 202, 204, 206 does not, cache replacement manager 230 determines which load unit 220 will be replaced based on information from the operating systems of processor cores 202, 204, 206 and the tasks being executed in each of processor cores 202, 204, 206, as will be more fully described below. The size of internal memory 216 may be selected to accommodate smaller load units 220 having variable sizes while the rest of the instructions and data corresponding to portions of an application that are not planned for execution remain in external memory device 234. The result is that the size of internal memory 216 will be smaller than otherwise needed to accommodate all of the data and instructions associated with a particular application if external memory device 234 were not available.

Processing system 200 is capable of managing a set of cache eviction candidates to enable variable sized load units 260 for cache management, effectively decoupling the generation of cache eviction candidates from their usage for the cache eviction. This decoupling permits a larger time span between generating a cache eviction candidate and using the cache eviction candidate, which permits a more sophisticated search for a "more optimal" candidate. In contrast, traditional Level 1/Level 2 cache 208, 210, 212 that operate on demand have to provide the eviction candidate more or less instantly.

The ability to search for a more optimal eviction candidate enables a beneficial cache replacement strategy that seeks to keep the more "valuable" load units within the OTC instruction cache 218 by a better selection of eviction candidates. However, such a selection process can be expensive in term of the amount of required operations, which also translates into the timespan required for the effort, which makes it desirable to avoid needless operations. For this purpose, the selection rate for generating cache eviction candidates can be controlled to permit a selection of cache eviction candidates that can be adjusted with the current processing needs of system 200. In some embodiments, a fill level of the area for storing eviction candidates in cache replacement manager 230 can be used as criteria for controlling the selection process. A set of controlling levels (for example, a DRAIN, an ERROR, and an EMPTY level) can be defined and an acceleration factor (for example, accelerate the selection rate ×2, ×8, ×16) can be assigned to each controlling level. Eviction candidates can then be selected with a basic selection rate, and whenever one of the controlling levels is reached the selection rate for generating cache eviction candidates can be accelerated. For example, when specifying a three-fourths fill level as the DRAIN level, the selection rate can be doubled to generate twice the number of cache eviction candidates when there are less than three-fourths of the potential set of managed eviction candidates. When the area for storing such candidates is full again, the selection rate may return to a basic (slower) speed.

Functions performed by load entity queues 226 includes selecting and vetoing eviction candidates. Cache replacement manager 230 performs arbitration of N managed eviction candidate(s) to identify an eviction candidate, broadcasts the identified eviction candidate(s) to load entity queues 226, and receives acknowledgement and/or vetoes of the identified eviction candidate(s). Address map device 245 generates a request for an eviction candidate when required, and handles evicting the identified eviction candidate(s) when loading a requested load unit 260 by the load manager 228 requires an eviction candidate. Cache replacement manager 230 provides the eviction candidate from its managed eviction candidates 236 upon a request from address map device 245. Cache replacement manager 230 also broadcasts the identified eviction candidate to load entity queues 226, and receives acknowledgement and/or vetoes of the eviction candidate. A vetoed eviction candidate will not be used and the veto process is repeated after another eviction candidate is selected. Processes performed by execution units in OTC controller 224 including load entity queues 226, cache replacement manager 230, address map device 245 and load manager 228 can be performed independently and concurrently from the other processes. Also, any of the processes can be performed concurrently by multiple related execution units, resulting in multiple eviction processes, when multiple execution units are available.

The process of selecting an eviction candidate can be performed by one or more of N load entity queues 226 that manage a set of load units 260, for example, any load entity queue 226 associated with a bus master that has the characteristics of a processor core 202, 204, 206. Usually, processor core 202, 204, 206 bus masters will be a subset of bus masters 202, 204, 206, 207 implemented within microcontroller 201.

Figure 3:
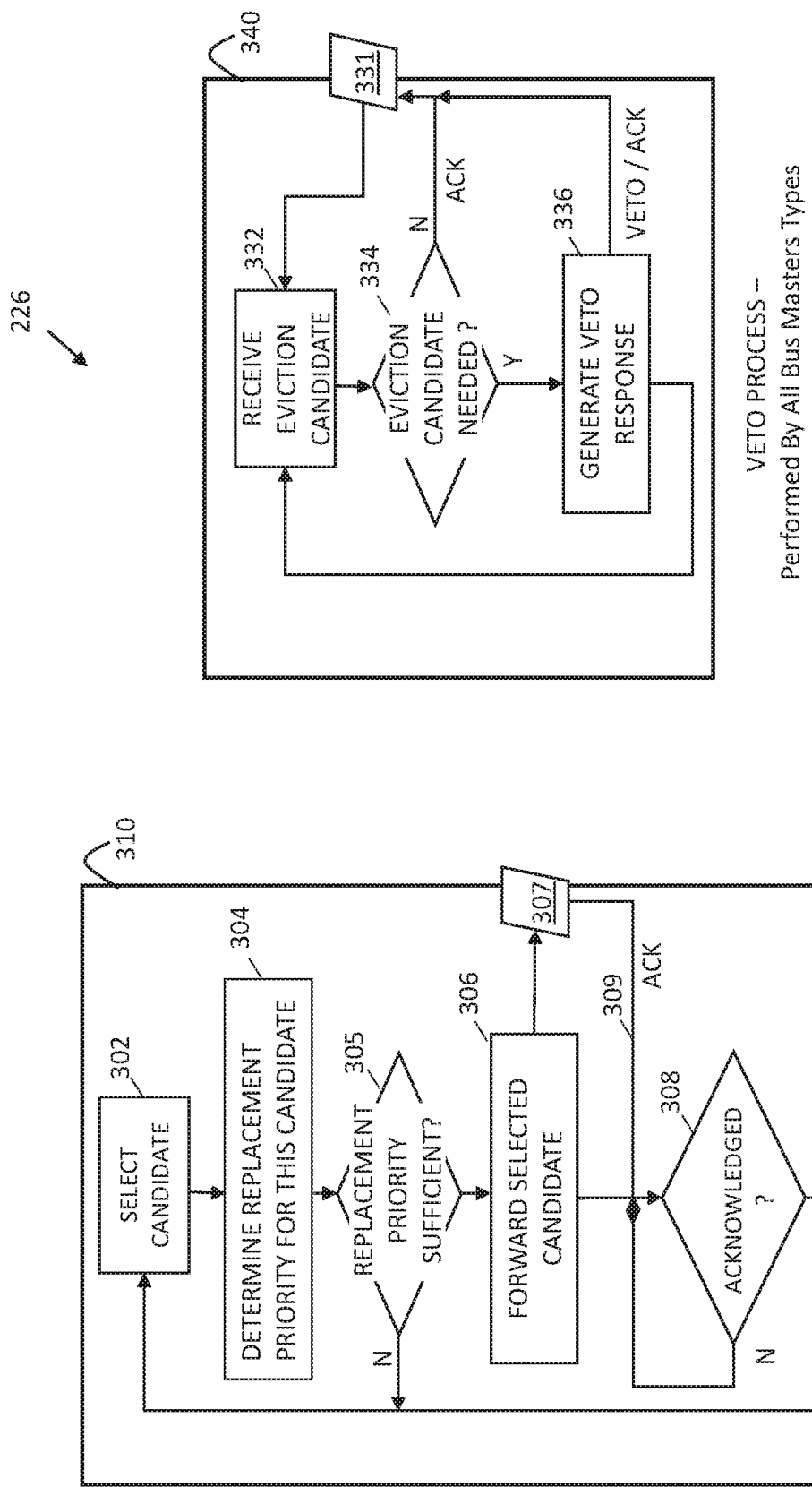
FIG. 3 illustrates a flowchart of functions performed by a load entity queue in a cache controller to manage cache eviction candidates in the processing system of FIG. 2 in accordance with selected embodiments.
Figure 4:
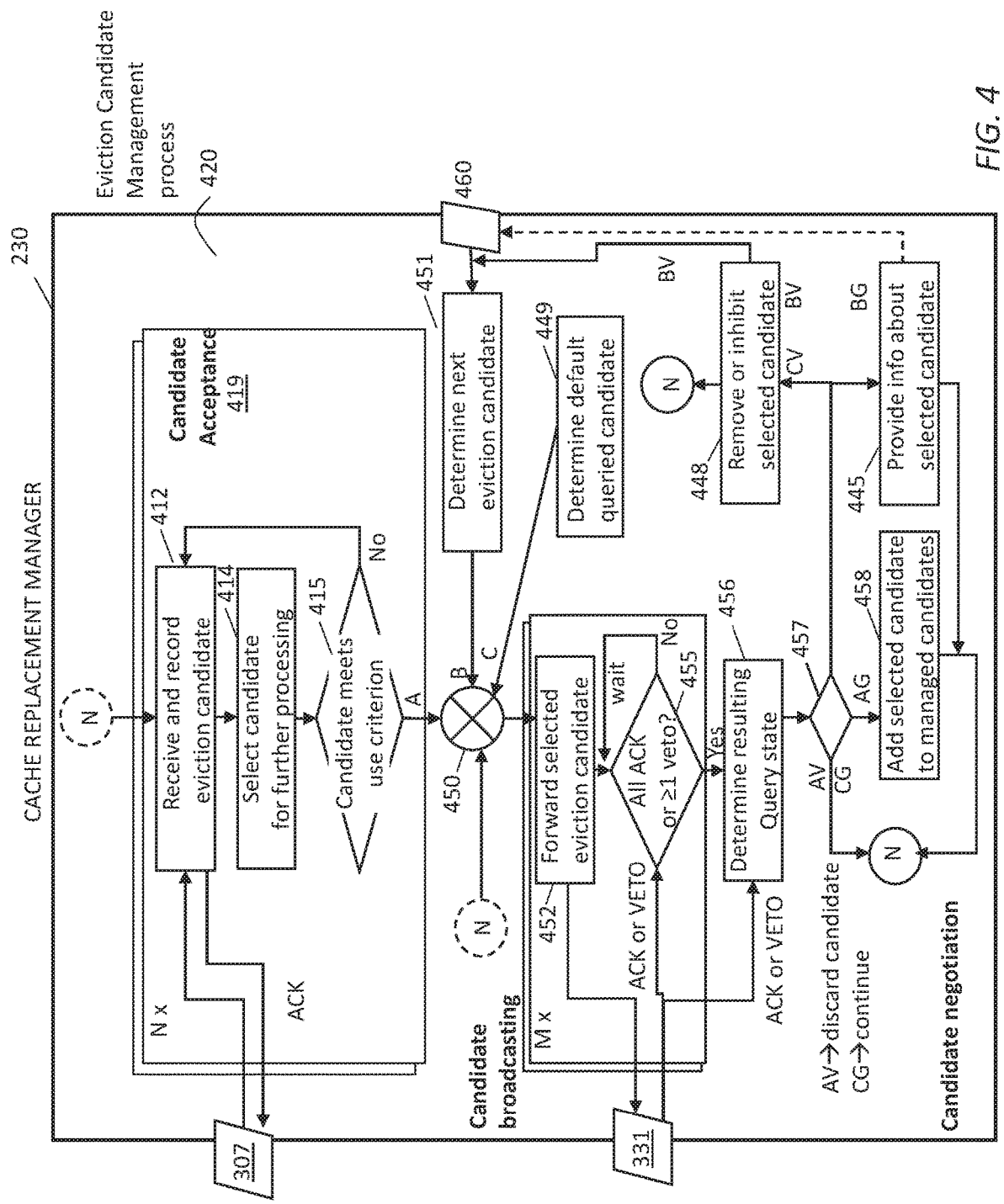
FIG. 4 illustrates a flowchart of functions performed by a cache replacement manager in a cache controller to manage cache eviction candidates in the processing system of FIG. 2 in accordance with selected embodiments.
Figure 5:
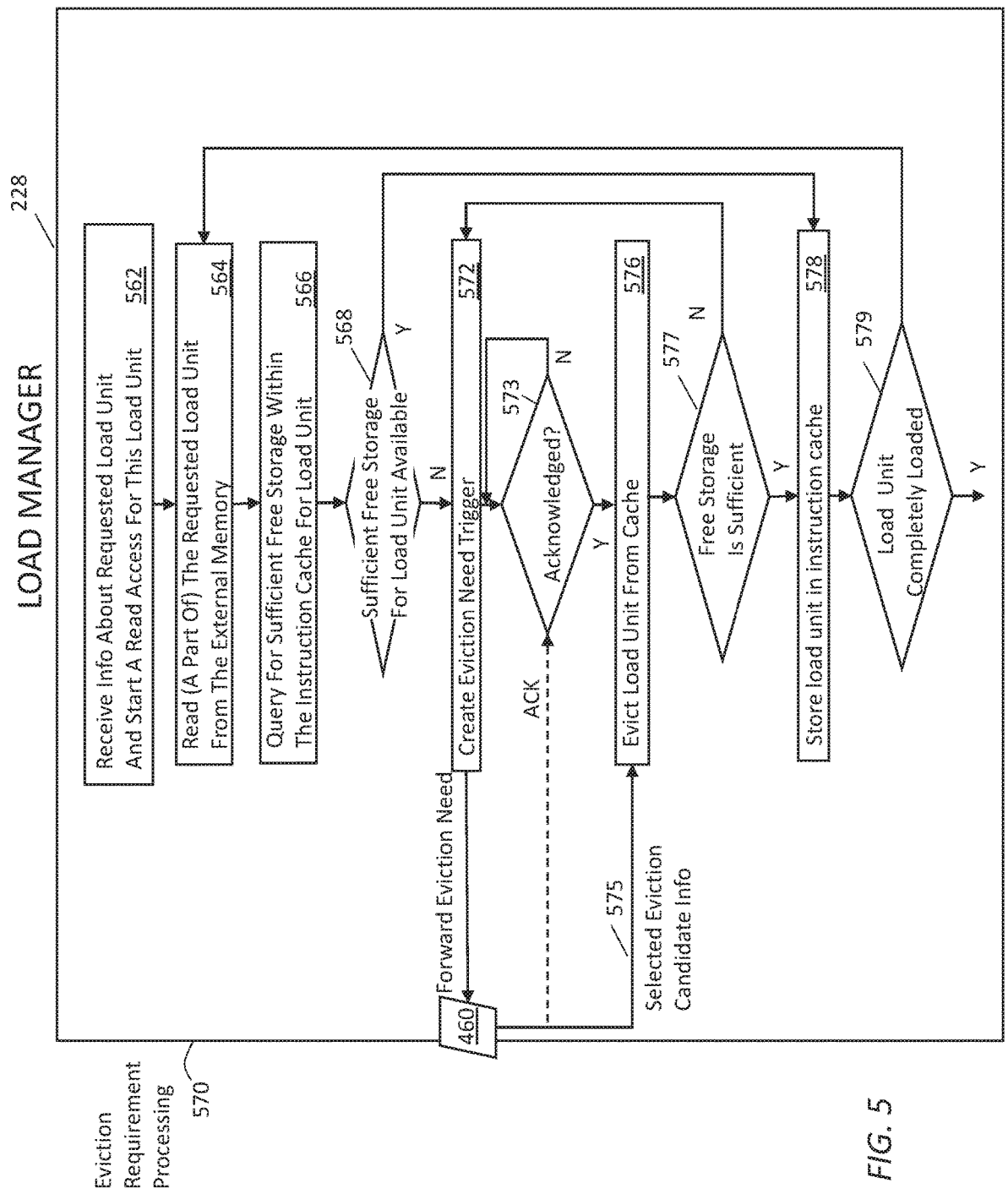
FIG. 5 illustrates a flowchart of functions performed by a load manager and address map device in a cache controller to manage cache eviction candidates in the processing system of FIG. 2 in accordance with selected embodiments.

FIGS. 3-5 illustrate flowcharts of processes 310, 340, 320, 370 performed by respective load entity queues 126, cache replacement manager 230, address map device 245, and load manager 228 to manage cache eviction candidates in the processing system 200 of FIG. 2 in accordance with selected embodiments.

Eviction candidate selection process 310 can be performed continuously and can include processes 302-309 as shown in FIG. 3. Referring to FIGS. 2 and 3, eviction candidate selection process 310 begins with process 302 to select an eviction candidate from the subset of load units 260 managed by a particular load entity queue 226. For example, selecting an eviction candidate for the particular load entity queue 226 at random, by selecting one of the managed subset of load units 260 in a predefined order, or any other selection criteria that may defined for such a process. Process 304 determines a replacement priority for a selected cache eviction candidate. For example, a predetermined replacement priority may be used as a criterion to select a cache eviction candidate. If a replacement priority determined for a selected cache eviction candidate is not sufficient, process 305 may discontinue further processing of a particular eviction candidate and return to process 302.

Process 305 transitions to process 306 to forward the selected cache eviction candidate and any other relevant information to cache replacement manager 230 if the replacement priority is sufficient. The forwarding operation in process 306 may involve an optional handshake process 307 that waits for cache replacement manager 230 to provide an acknowledgement 309 that the selected cache eviction candidate has been accepted for further processing. Handshake process 307 may be required for situations where multiple load entity queues 226 provide eviction candidates so quickly that eviction candidate management process 420 (FIG. 4) cannot immediately process them, for example, because an earlier forwarded eviction candidate is still being processed and sufficient storage Is not available to record a received eviction candidate for later processing. In other embodiments, handshake process 307 may not be implemented and instead a selected eviction candidate may be discarded when processing resources are not available. In such a case, acknowledgement 309 can be generated immediately without involving cache replacement manager 230. As soon as the selected eviction candidate has been acknowledged for further processing (or has been discarded) process 308 transitions to process 302 to repeat eviction candidate selection processes 302-309.

Referring now to FIGS. 2 and 4, flow diagrams of examples of processes performed by cache replacement manager 230 are shown in FIG. 4 including eviction candidate management process 420 to maintain managed eviction candidates 236. Candidate management process 420 includes candidate acceptance process 419, which can be performed concurrently by replicated hardware elements equivalent to the number N of load entity queues 226 providing a new eviction candidate. In other embodiments, candidate acceptance process 419 may be performed repeatedly by a single set of hardware element(s) observing the handshake process 307 to the N load entity queues 226. The remaining processes of eviction candidate management process 420 is typically performed only once within a single cache replacement manager 230, however, there may be multiple cache replacement managers 230 required to manage multiple lists of managed eviction candidates 236. For example, multiple lists of managed eviction candidates 236 may be required when a segmented memory is used and a list of managed eviction candidates 236 is required for every memory segment.

Candidate acceptance process 419 can be performed continuously, beginning with process 412 to receive an eviction candidate that has been forwarded from a load entity queue 226. Process 412 records the eviction candidate and may then generate an acknowledged signal that is sent to candidate selection process 310 via handshake process 307. Process 414 selects a new eviction candidate for further processing and may utilize some selection criterion, for example, a replacement priority associated with an eviction candidate. Process 415 may compare the selection criterion against corresponding information associated with the other eviction candidates stored within the list of managed eviction candidates 236. For example, process 415 can include determining whether a new eviction candidate has sufficient relevance for being added as a new eviction candidate. Relevancy may, for example, be determined by a minimum priority that can be hardcoded, programmable, or made dependent on the other eviction candidates. If the new eviction candidate does not fulfill the selection criterion or has insufficient relevance, the new candidate can be discarded, and process 415 transitions to process 412 to receive and record another eviction candidate. Otherwise process 415 transitions to process 450.

The rest of eviction candidate management process 420 can have multiple trigger events, for example, Trigger A can occur when a new eviction candidate has been accepted by candidate acceptance 419 and will be further processed. Trigger B can occur when an eviction requirement has been identified by eviction need process 570 (FIG. 5) and forwarded to cache replacement manager 230 via handshake process 460. Trigger C can occur when neither trigger A or B have occurred and a default processing is selected. Each trigger A, B, C has an associated eviction candidate and therefore arbitration process 450 can be used to select one of the eviction candidates from triggers A, B or C for further processing. In some embodiments, the eviction candidate associated with trigger B has the highest priority and will always be selected when present. Before the eviction candidate associated with Trigger B is forwarded to arbitration process 450, process 451 can be performed to determine the next eviction candidate within managed eviction candidates list 236 in accordance with a predetermined criterion. Process 451 forwards the determined eviction candidate to arbitration process 450.

The eviction candidate associated with trigger A can have the next highest priority and can be selected when there is no eviction candidate associated with trigger B. The new eviction candidate accepted by eviction candidate acceptance process 419 will be forwarded to arbitration process 450.

An eviction candidate associated with trigger C can have the lowest priority and can be selected when there is no other eviction candidate from triggers A or B. In some embodiments, trigger C may not be implemented. If an eviction candidate is to be used for trigger C, however, process 449 can be performed to determine an eviction candidate from managed eviction candidates 236 to forward to arbitration process 450.

Once arbitration process 450 is performed, subsequent processing is equivalent in many aspects for eviction candidates associated with triggers A, B or C. The eviction candidate selected in arbitration process 450 is also referred to as the "queried eviction candidate".

Subsequent to arbitration process 450, process 452 forwards information regarding the queried eviction candidate to all M load entity queues 226 via M number of handshake interfaces 331. Process 455 can wait until an acknowledge signal is sent from all M load entity queues 226 or a single veto signal is received from one or more of M load entity queues 226 via handshake interfaces 331 for the queried eviction candidate.

Process 456 is performed after all M load entity queues 226 have provided an acknowledge signal, or one or more of the M load entity queues 226 have provided a veto signal, in process 455. Process 456 determines a query state for the queried eviction candidate that is either vetoed (V) when at least one veto signal was received for the queried eviction candidate, or a query state of granted (G) when an acknowledged signal was received for the queried eviction candidate from all M load entity queues 226.

In process 457, when the queried eviction candidate is associated with trigger A and the query state is granted (denoted as "AG"), then process 458 is performed to add the queried eviction candidate to the list of managed eviction candidates 236. If the list of managed eviction candidates 236 is already full, the queried eviction candidate may replace one or more eviction candidates in the list of managed eviction candidates 236. Process 458 may determine that the queried eviction candidate has an insufficient replacement priority compared to eviction candidates already populating the list of managed eviction candidates 236. In such a case, the queried eviction candidate is not added to the list of managed eviction candidates 236 and process 458 transitions to either arbitration process 450 when candidate acceptance process 419 is performed independently of the rest of eviction candidate management process 420, or to process 412 to select a new eviction candidate when process 419 and the rest of process 420 are performed sequentially.

When the queried eviction candidate is associated with trigger A and the query state is vetoed (denoted as "AV"), the queried eviction candidate is discarded and process 458 transitions to either arbitration process 450 when candidate acceptance process 419 is performed independently of the rest of eviction candidate management process 420, or to process 412 to select a new eviction candidate when process 419 and the rest of process 420 are performed sequentially.

When the queried eviction candidate is associated with trigger B and the query state is granted (denoted as "BG"), process 445 can be performed to provide information associated with the queried eviction candidate together with an acknowledged signal to handshake process 460. Process 445 then transitions to process 450 for a subsequent round of arbitration for eviction candidates. Alternatively, when the queried eviction candidate is associated with trigger B and the query state is vetoed (denoted as "By"), process 448 is performed to either remove the queried eviction candidate from the list of managed eviction candidates 236 or set a flag associated with the queried eviction candidate to inhibit further processing and modify the replacement priority of the queried eviction candidate to a level that prevents selection of the queried eviction candidate. Process 448 then provides information associated with the queried eviction candidate together with the vetoed signal to handshake process 460 and transitions to either arbitration process 450 when candidate acceptance process 419 is performed independently of the rest of eviction candidate management process 420, or to process 412 to select a new eviction candidate when process 419 and the rest of process 420 are performed sequentially.

When the queried eviction candidate is associated with trigger C and the query state is granted (denoted as "CG") the queried eviction candidate is not further processed and process 457 transitions to arbitration process 450 for a subsequent round of arbitration for eviction candidates. When the query state is vetoed (denoted as "CV") for a queried eviction candidate associated with trigger C, process 457 transitions to process 448 to either remove the queried eviction candidate from the list of managed eviction candidates 236 or set a flag associated with the queried eviction candidate to inhibit further processing and modify the replacement priority of the queried eviction candidate to a level that prevents selection of the queried eviction candidate. Process 448 then transitions to either arbitration process 450 when candidate acceptance process 419 is performed independently of the rest of eviction candidate management process 420, or to process 412 to select a new eviction candidate when process 419 and the rest of process 420 are performed sequentially.

Process 419 and the rest of process 420 may be performed sequentially or independently of one another. With the exception of processing queried eviction candidates with query status "BV", eviction candidate management process 420 continues from processes 457, 458, 445 to either arbitration process 450 when candidate acceptance process 419 is performed independently of the rest of eviction candidate management process 420, or to process 412 to select a new eviction candidate when process 419 and the rest of process 420 are performed sequentially. When the queried eviction candidate has a query status of BV, then process 448 transitions to process 451 to select another eviction candidate. Process 451 then transitions to arbitration process 450 to start the arbitration process again.

Referring again to FIGS. 2 and 3, FIG. 3 illustrates a flowchart of an embodiment of candidate veto process 340, which can be performed by each of the M load entity queues 226 for both processor core and non-processor core bus masters 202-207. Candidate veto process 340 can be performed continuously and independently from candidate selection process 310.

Process 332 receives an eviction candidate broadcast by cache replacement manager 230 via handshake process 331. Process 334 compares the broadcasted eviction candidate with the set of load unit instances the load entity queue 226 has identified as needed. In case the broadcasted eviction candidate is not needed by this load entity queue 226, process 334 sends an acknowledge signal to handshake process 331 without providing a veto signal and process 332 can receive a further broadcasted eviction candidate via handshake process 331. If process 334 determines the broadcasted eviction candidate is needed by load entity queue 226, process 336 provides a veto signal and an acknowledged signal to handshake process 331. Handshake process 331 transfers the acknowledge signal and veto signal to cache replacement manager 230.

Referring now to FIGS. 2 and 5, a flow diagram of examples of processes performed by load manager 228 are shown in FIG. 5 including eviction need process 570 to generate a need to select an eviction candidate. Eviction need process 570 is performed when a load unit request is received by load manager 228. Process 562 receives load unit information 232 corresponding to a requested load unit 260 and starts a read access from external memory 234 by load manager 228. Process 564 reads the content of the requested load unit 260 (or a part of the requested load unit until a buffer memory in load manager 234 is full) from external memory 234. In process 566, load manager 228 queries address map device 245 for free storage within instruction cache 218. When there is sufficient free storage in instruction cache 219, process 568 transitions to process 578 to store all or part of a temporary copy 220 of load unit 260 in instruction cache 219. When address map device 245 cannot identify sufficient space to store all or part of a temporary load unit 220 that is a copy of the requested load unit 260 in instruction cache 218, process 572 creates an eviction need and forwards the eviction need to handshake process 460.

Process 573 waits until an acknowledged signal is received by handshake process 460. Upon receiving the acknowledged signal in process 573, process 576 utilizes information about the selected eviction candidate received together with the acknowledged signal and evicts the corresponding temporary load unit 220 in instruction cache 218 using address map device 245. If process 577 determines there is insufficient space to store a temporary load unit 220 that is a copy of the requested load unit 260, process 577 transfers control to process 572 to create another eviction need. Processes 572 to 577 may be repeated until the available storage in instruction cache 218 is sufficient to store all or part of the temporary load unit 220 that is a copy of the requested load unit 260. When process 577 determines there is sufficient space to store all or part of a temporary copy 220 of the requested load unit 260 in instruction cache 218, process 577 transitions to process 578 to store all or part of the temporary load unit 220 in instruction cache 218. Process 579 determines whether the temporary load unit 220 is completely loaded, and if so, process 570 is completed. If the temporary load unit 220 is not completely loaded, process 579 transitions to process 564 to read another part of the requested load unit. Processes 564 to 579 are repeated until a complete copy of the requested load unit 260 is copied into the corresponding temporary load unit 218 in instruction cache 218.

By now it should be appreciated that in some embodiments there has been provided a processing system that can include a microcontroller device and an external memory device external to the microcontroller device. The external memory device can be coupled to the microcontroller device. The microcontroller device can include bus masters (202-206) configured to execute application codes, a random access memory (RAM) device (216) internal to the microcontroller device and coupled to the bus masters via an interconnect. The RAM device can include a system memory portion (222) and an instruction portion (218). The instruction portion can be configured to store copies of a subset of load units from the external memory device for use by the application codes. The load units can include executable instructions and/or data, and are associated with a corresponding one of the application codes. A cache controller device (224) can be coupled to the random access memory and the external memory device and include load entity queues. Each of the load entity queues is associated with one of the bus masters. The cache controller device can be configured to manage a set of eviction candidates, periodically select an eviction candidate from the copies of the load units in the instruction portion, discard the eviction candidate if at least one of the load entity queues vetoes the eviction candidate, and replace the eviction candidate in the instruction portion with a copy of a requested load unit.

In another aspect, each of the load entity queues can be configured to request loading of a load unit (260) and periodically select an eviction candidate to include in the set of managed eviction candidates from the copies of the load units in the instruction portion that are associated with the load entity queue.

In another aspect, the cache controller can further comprise an address map device (245) operable to manage the instruction portion (218) of the internal memory (216) including keeping track of storage occupied by the copies of the subset of load units (220) and available storage within the instruction portion that is not occupied by the copies of the subset of load units.

In another aspect, the cache controller can further comprise a load manager device configured to process requests to load the load units from the external memory device, and query the address map device for an available storage location within the instruction portion (218) that has a size sufficient to store a copy of at least a portion of a requested load unit.

In another aspect, the processing system can further comprise a cache replacement manager device (230) coupled to the load entity queues 226 and the address map device. The cache replacement manager device can select one of the set of managed eviction candidates upon a request by the address map device (245) when there is insufficient storage for storing a complete copy of the requested load unit, and validate the selected eviction candidate. The address map device (245) can respond to a query by the load manager device (228) by providing the available storage location when sufficient storage space is available, and by repeatedly requesting an additional eviction candidate from the cache replacement manager device (230) and evicting the additional eviction candidate from the instruction portion until sufficient storage space is available for a complete copy of the requested load unit in the instruction portion.

In another aspect, the cache controller device can be further configured to broadcast the eviction candidate to the load entity queues, and validate the eviction candidate when an acknowledge signal is received without a veto response from all load entity queues.

In another aspect, a respective load entity queue can grant usage of the broadcasted eviction candidate when a load unit corresponding to the eviction candidate is not currently needed by the respective load entity queue.

In another aspect, each load entity queue can be associated with exactly one bus master and every load entity queue manages only load units associated with application codes executed by the corresponding bus master.

In another aspect, the respective load entity queue can identify a copy of a load unit as currently needed when at least one of the following conditions is met for the load unit: a) the load unit is currently in use by the bus master associated with the load entity queue, b) the load unit has been used recently by the bus master associated with the load entity queue, and c) the load entity queue is aware that the load unit will be used in the foreseeable future by the bus master associated with the load entity queue.

In another aspect, each load unit can be specified by an address range corresponding to an address range in the external memory and at least two of the load units have different lengths.

In other embodiments, a method of managing load units of executable instructions between internal memory in a microcontroller with multiple bus masters, and a non-volatile memory device external to the microcontroller, can include loading a copy of the load units from the external memory device into the internal memory for use by corresponding bus masters. Each load unit can be associated with a corresponding load entity queue and each load entity queue being associated with a corresponding one of the multiple bus masters. Each load entity queue can select an eviction candidate from the associated copy of the load units currently loaded in the internal memory. Information identifying the eviction candidate for each load entity queue can be broadcasted to all load entity queues. The eviction candidate can be added to a set of managed eviction candidates if none of the load entity queues vetoes using the eviction candidate.

In another aspect, the method can further comprise periodically selecting an eviction candidate from the copies of the load units in the internal memory associated with each load entity queue, discarding the eviction candidate if at least one of the load entity queues vetoes the eviction candidate, and replacing the eviction candidate in the internal memory with a copy of a requested load unit.

In another aspect, one of the load entity queues vetoes the eviction candidate if the load entity queue is using the copy of the load unit.

In another aspect, the method can further comprise approving the eviction candidate when all of the load entity queues determine at least one of: a) the eviction candidate does not correspond to a copy of a load unit that is currently being used, and b) the copy of the load unit corresponding to the eviction candidate has not been recently used.

In another aspect, the method can further comprise managing the copy of the load units in the internal memory (216) by tracking storage occupied by each copy of the load units (220) and available storage within the internal memory that is not occupied by the copies of the load units, wherein at least two of the copies of the load units have different lengths.

In another aspect, the method can further comprise issuing a query for an available storage location within the internal memory (116) that has a size sufficient to store a copy of a requested load unit, or a portion of the copy of the requested load unit.

In another aspect, the method can further comprise responding to the query by providing the available storage location when sufficient storage space is available, and by repeatedly requesting an additional eviction candidate until sufficient storage space is available in the instruction portion for the copy of the load unit.

In another aspect, the method can further comprise validating the eviction candidate when an acknowledge signal is received without a veto response from all load entity queues.

In another aspect, the method can further comprise granting usage of the broadcasted eviction candidate when the copy of the load unit associated with the eviction candidate is not currently needed by the corresponding load entity queue.

In another aspect, each load entity queue can be associated with exactly one bus master and every load entity queue manages only load units associated with application codes executed by the corresponding bus master.

Although the described exemplary embodiments disclosed herein are directed to methods and systems which may be applied to Systems and methods for managing cache replacement, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein may be implemented as software or operations on data within a computer memory, implemented with hardware circuitry, or firmware, or a combination of software, hardware and firmware. Such descriptions and representations are used by those skilled in the art to describe and convey the substance of their work to others skilled in the art. Microcontrollers (MCUs) such as MCU 201 (FIG. 2) and System(s)-on-a-Chip (SoC) are examples of small computer processing systems formed with integrated circuits. Each processing system contains one or more central processing units (CPUs), memory for storing executable software instructions and/or data, programmable peripherals such as timers, etc. The integrated circuits operate to execute software and/or firmware instructions, and/or to perform certain functions and/or store information using hardware circuits alone. The present disclosure is described with reference to MCU 201 and/or methods and processes performed on MCU 201, it being understood the present disclosure can find use in many types of computer processing systems and should not be limited to use in MCUs. The use of the term "device" herein refers to circuitry that stores information such as instructions and/or data and/or executes instructions in software or firmware, hardware circuits themselves, and/or a combination of circuitry for storing instructions and/or data, and/or performing functions using software, firmware, and/or hardware.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, device, article, or apparatus that comprises a list of elements does not include only those elements but may include other elements not expressly listed or inherent to such process, method, device, article, or apparatus.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

What is claimed is:

1. A processing system comprising:
a microcontroller device;
an external memory device external to the microcontroller device, the external memory device coupled to the microcontroller device;
the microcontroller device including:
  bus masters configured to execute application codes;
  a random access memory (RAM) device internal to the microcontroller device and coupled to the bus masters via an interconnect, the RAM device including a system memory portion and an instruction portion, the instruction portion configured to store copies of a subset of load units from the external memory device for use by the application codes, wherein the load units include executable instructions and/or data, and are associated with a corresponding one of the application codes;
  a cache controller device coupled to the random access memory and the external memory device and including load entity queues, each of the load entity queues is associated with one of the bus masters, the cache controller device configured to:
    manage a set of eviction candidates which includes
      i) selection of further eviction candidates to include in the set of eviction candidates, and
      ii) removal of a first eviction candidate selected from the set of eviction candidates for replacement with a copy of a requested load unit;
    select based on a controllable selection rate a second eviction candidate from the copies of the load units in the instruction portion to include in the set of eviction candidates;
    discard the first eviction candidate or second eviction candidate if at least one of the load entity queues vetoes the first eviction candidate or the second eviction candidate where the veto is arranged to occur at one or more of i) before addition of the second eviction candidate to the set of eviction candidates, and
ii) before replacement of the first eviction candidate selected from the set of eviction candidates with the copy of a requested load unit; and
replace the first eviction candidate selected from the set of eviction candidates in the instruction portion with the copy of the requested load unit stored in the external memory in response to selecting the first eviction candidate from the set of eviction candidates.

2. The processing system of claim 1, wherein each of the load entity queues are configured to request loading of a load unit and select based on the controllable selection rate, the second eviction candidate to include in the set of managed eviction candidates from the copies of the load units in the instruction portion that are associated with the load entity queue.

3. The processing system of claim 1, the cache controller further comprising:
an address map device operable to manage the instruction portion of the internal memory including keeping track of storage occupied by the copies of the subset of load units and available storage within the instruction portion that is not occupied by the copies of the subset of load units.

4. The processing system of claim 3, the cache controller further comprising:
a load manager device configured to process requests to load the load units from the external memory device, and query the address map device for an available storage location within the instruction portion that has a size sufficient to store a copy of at least a portion of a requested load unit.

5. The processing system of claim 4, further comprising:
a cache replacement manager device coupled to the load entity queues and the address map device, wherein
the cache replacement manager device selects one of the set of managed eviction candidates upon a request by the address map device when there is not sufficient storage for storing a complete copy of the requested load unit, and validates the selected eviction candidate, and
the address map device responds to a query by the load manager device by providing the available storage location when sufficient storage space is available, and by repeatedly requesting an additional eviction candidate from the cache replacement manager device and evicting the additional eviction candidate from the instruction portion until sufficient storage space is available for a complete copy of the requested load unit in the instruction portion.

6. The processing system of claim 1, wherein the cache controller device is further configured to:
broadcast the first or second eviction candidate to the load entity queues;
validate the first or second eviction candidate when an acknowledge signal is received without a veto response from all load entity queues.

7. The processing system of claim 6, wherein a respective load entity queue grants usage of the broadcasted eviction candidate when a load unit corresponding to the first or second eviction candidate is not currently needed by the respective load entity queue.

8. The processing system of claim 1, wherein each load entity queue is associated with exactly one bus master and every load entity queue manages only load units associated with application codes executed by the corresponding bus master.

9. The processing system of claim 7, wherein the respective load entity queue identifies a copy of a load unit as currently needed when at least one of the following conditions is met for the load unit: a) the load unit is currently in use by the bus master associated with the load entity queue, b) the load unit has been used recently by the bus master associated with the load entity queue, and c) the load entity queue is aware that the load unit will be used in the foreseeable future by the bus master associated with the load entity queue.

10. The processing system of claim 2, wherein each load unit is specified by an address range corresponding to an address range in the external memory and at least two of the load units have different lengths.

11. The processing system of claim 1, wherein the selection rate is controlled based on a fill level of a memory for storing the set of eviction candidates; wherein the selection rate is adjusted based on the fill level.

12. The processing system of claim 1, wherein the selection of the second eviction candidate to include in the set of eviction candidates is independent of the selection of the first eviction candidate from the set of eviction candidates and the replacement of the selected first eviction candidate.

13. A method of managing load units of executable instructions between internal memory in a microcontroller with multiple bus masters, and a non-volatile memory device external to the microcontroller, the method comprising:
loading a copy of the load units from the external memory device into the internal memory for use by corresponding bus masters, each load unit being associated with a corresponding load entity queue and each load entity queue being associated with a corresponding one of the multiple bus masters;
selecting based on a controllable selection rate by each load entity queue an eviction candidate from the associated copy of the load units currently loaded in the internal memory;
broadcasting information identifying the eviction candidate for each load entity queue to all load entity queues; and
adding the eviction candidate to a set of managed eviction candidates if none of the load entity queues vetoes using the eviction candidate.

14. The method of claim 13, further comprising:
selecting, based on the controllable selection rate, an eviction candidate from the copies of the load units in the internal memory associated with each load entity queue;
discarding the eviction candidate if at least one of the load entity queues vetoes the eviction candidate; and
replacing the eviction candidate in the internal memory with a copy of a requested load unit.

15. The method of claim 13, wherein one of the load entity queues vetoes the eviction candidate if the load entity queue is using the copy of the load unit.

16. The method of claim 15, further comprising approving the eviction candidate when all of the load entity queues determine at least one of: a) the eviction candidate does not correspond to a copy of a load unit that is currently being used, and b) the copy of the load unit corresponding to the eviction candidate has not been recently used.

17. The method of claim 13, further comprising: managing the copy of the load units in the internal memory by tracking storage occupied by each copy of the load units and available storage within the internal memory that is not occupied by the copies of the load units, wherein at least two of the copies of the load units have different lengths.

18. The method of claim 17, further comprising: issuing a query for an available storage location within the internal memory that has a size sufficient to store a copy of a requested load unit, or a portion of the copy of the requested load unit.

19. The method of claim 18, further comprising:
responding to the query by providing the available storage location when sufficient storage space is available, and by repeatedly requesting an additional eviction candidate until sufficient storage space is available in the instruction portion for the copy of the load unit.

20. The method of claim 13, further comprising:
validating the eviction candidate when an acknowledge signal is received without a veto response from all load entity queues.

21. The method of claim 13, granting usage of the broadcasted eviction candidate when the copy of the load unit associated with the eviction candidate is not currently needed by the corresponding load entity queue.

22. The method of claim 13, wherein each load entity queue is associated with exactly one bus master and every load entity queue manages only load units associated with application codes executed by the corresponding bus master.

23. The method of claim 13, wherein the selection rate is controlled based on a fill level of a memory for storing the set of eviction candidates; wherein the selection rate is adjusted based on the fill level.

24. The method of claim 13, wherein the selection of the second eviction candidate to include in the set of eviction candidates is independent of the selection of the first eviction candidate from the set of eviction candidates and the replacement of the selected first eviction candidate.

* * * * *